(12) United States Patent
Eidson

(10) Patent No.: US 6,998,996 B1
(45) Date of Patent: Feb. 14, 2006

(54) MOTION CONTROL USING TIME SYNCHRONIZATION

(75) Inventor: John C. Eidson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 603 days.

(21) Appl. No.: 09/205,115

(22) Filed: Dec. 3, 1998

(51) Int. Cl.
*H04Q 1/00* (2006.01)

(52) U.S. Cl. .................................. 340/825.2

(58) Field of Classification Search ............. 340/825.2, 340/825.21, 825.22, 825.23; 318/569, 574, 318/41, 568.2; 358/1, 3; 710/5; 370/516, 370/503; 700/169, 189, 61, 186, 14; 348/722; 327/292
See application file for complete search history.

(56) References Cited

U.S. PATENT DOCUMENTS

| | | | | |
|---|---|---|---|---|
| 3,887,796 A | * | 6/1975 | Trousdale et al. | 318/569 |
| 4,346,445 A | * | 8/1982 | Leuenberger et al. | 358/1.3 |
| 4,514,814 A | * | 4/1985 | Evans | 700/169 |
| 4,689,683 A | * | 8/1987 | Efron | 348/722 |
| 5,146,410 A | * | 9/1992 | Kawamura et al. | 700/189 |
| 5,218,549 A | * | 6/1993 | Kokura et al. | 700/189 |
| 5,287,010 A | * | 2/1994 | Hagiwara | 327/292 |
| 5,463,296 A | * | 10/1995 | Fugere et al. | 318/568.2 |
| 5,566,180 A | * | 10/1996 | Eidson et al. | 370/516 |
| 6,173,207 B1 | * | 1/2001 | Eidson | 700/14 |
| 2002/0186716 A1 | * | 12/2002 | Eidson | 370/503 |

FOREIGN PATENT DOCUMENTS

JP   2000-200106   *  7/2000

\* cited by examiner

*Primary Examiner*—Edwin C. Holloway, III

(57) ABSTRACT

A motion control system having a set of control nodes each of which controls motion along a single axis of the motion control system and which coordinate their collective motions using time synchronization technology. Each control node corresponds to an axis of the motion control system and each control node includes a synchronized clock and participates in a protocol for synchronizing the synchronized clocks. The application of a series of control values to each axis in the motion control system is coordinated using the synchronized clocks.

20 Claims, 3 Drawing Sheets

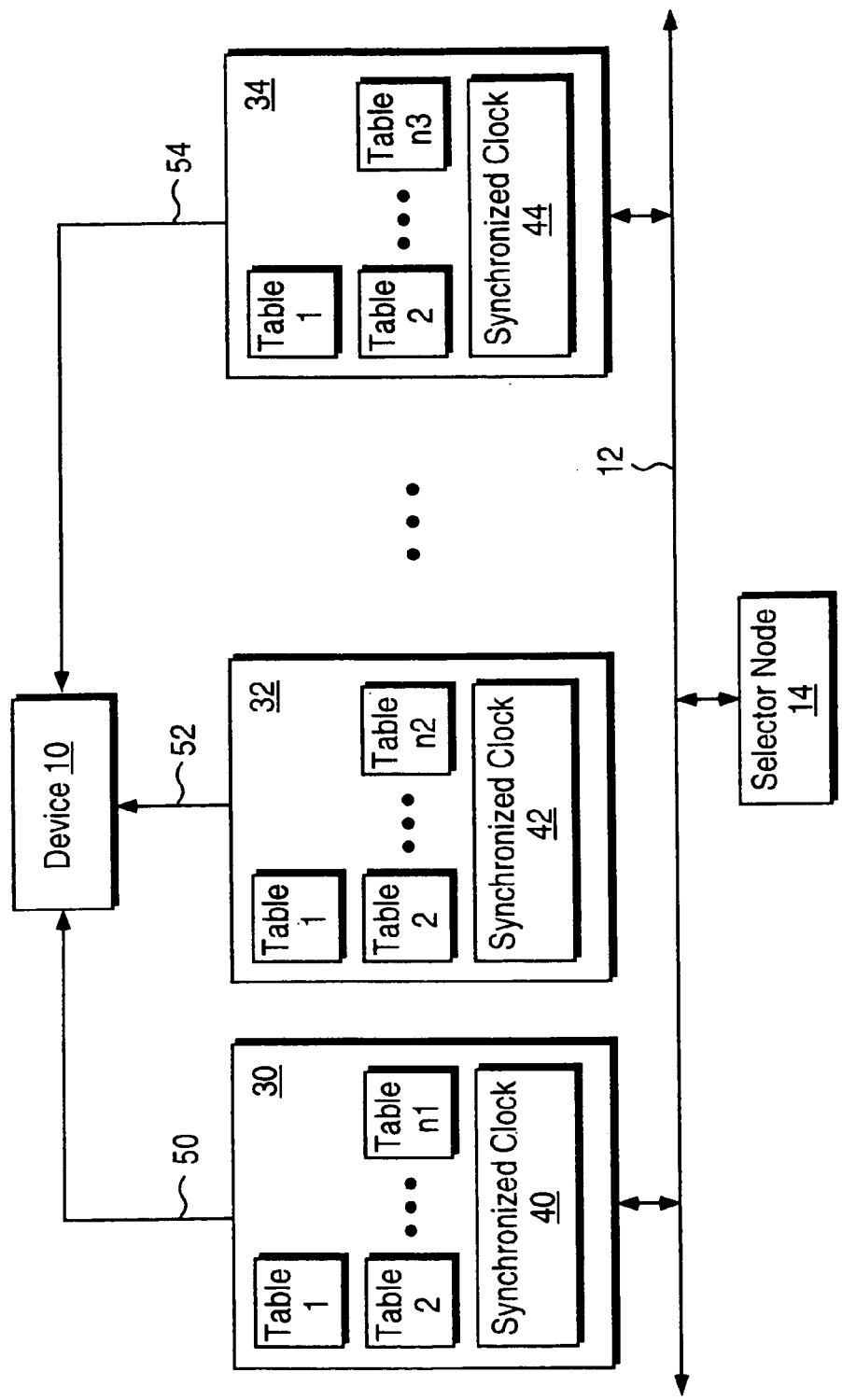

MOTION CONTROL USING TIME SYNCHRONIZATION

BACKGROUND OF THE INVENTION

1. Field of Invention

The present invention pertains to the field of systems. More particularly, this invention relates to motion control using time synchronization technology.

2. Art Background

Motion control systems are commonly employed in a wide variety of devices and systems including devices and systems used in industrial, office, and home environments. A motion control system may be defined as a control system that provides precise control of the movement of various actuating elements of a device or system. A controllable movement of an actuating element may be referred to as an axis or a degree of freedom. A typical motion control system includes an actuator for each axis and control circuitry that generates control values and provides the control values to the actuators as needed for a desired motion.

For example, a pen-based plotter usually includes an actuating element that moves a pen along an x axis and an actuating element that moves the pen along a y axis and these actuating elements provide two degrees of freedom for pen movement. Other degrees of freedom for pen movement in a plotter may be provided by actuating elements that change ink colors and actuating elements that move the pen into and out of contact with paper.

Prior motion control systems typically include a central controller which generates control values and provides the control values to the actuators in a sequence that will accomplish a desired motion. It is usually desirable that the control values be applied to the actuators with precise timing in order to precisely coordinate the motion among the axes. Any delay or skew in the application of control values to different actuators may cause deviation from the desire motion.

For example, a central controller in a plotter typically generates a series of x control values and a corresponding series of y control values when drawing a circle. It is usually desirable that each x control value be applied to the x actuator at the same time as the corresponding y control value is applied to the y actuator in order to prevent one axis or the other from deviating from the desired circle motion.

Prior motion control systems usually accomplish such precise coordination in the application of control values by employing control cards that enable the simultaneous application control values to multiple actuators. For example, a control card may have two output registers for applying control values to two different actuators. A central controller in such a system usually loads the output registers and then simultaneously triggers the outputs of both of the output registers to the actuators at the desired time. The tight coupling of the output registers on a card usually ensures that the corresponding control values are applied at substantially the same time.

Typically, such control cards are manufactured in standard numbers of axis, such as 2 or 4 axis, in order to be cost effective. If coordination is needed among more axes than a standard number then several cards may be necessary and some scheme must usually be devised for coordination among the cards. In addition, if portions of a motion control system are widely separated then coordination of the remote portions usually requires special attention to wiring or the use of specialized networks for communication among such prior control cards. Unfortunately, this usually increases the cost and complexity of a motion control system. On the other hand, fewer axes may be needed for a motion control system than are provided on such a prior control card. In that case the extra hardware purchased but not used usually adds unneeded costs to a motion control system. In addition, such prior control cards may make it difficult to upgrade a system if existing control cards cannot accommodate additional degrees of freedom.

SUMMARY OF THE INVENTION

A motion control system is disclosed having a set of control nodes each of which controls motion along a single axis of the motion control system and which coordinate their collective motions using time synchronization technology. Each control node corresponds to an axis of the motion control system and each control node includes a synchronized clock and participates in a protocol for synchronizing the synchronized clocks. The application of a series of control values to each axis in the motion control system is coordinated using the synchronized clocks.

A motion control system based on time synchronization enables the use of simpler and cheaper computing resources in each control node in comparison to prior systems in which one control card must handle multiple axes simultaneously. Each control node may be sized and optimized for the characteristics of a particular axis as well as the motion function to be implemented. Only the exact number of control nodes used in motion function are used and extra capacity is not wasted. A motion control system based on time synchronization enables the use of a conventional network communication link for clock synchronization rather than a specialized higher cost link that might otherwise be needed to coordinate motion control as may be the case prior systems.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 3 shows a motion control system which includes a selector node.

DETAILED DESCRIPTION

Figure 1:
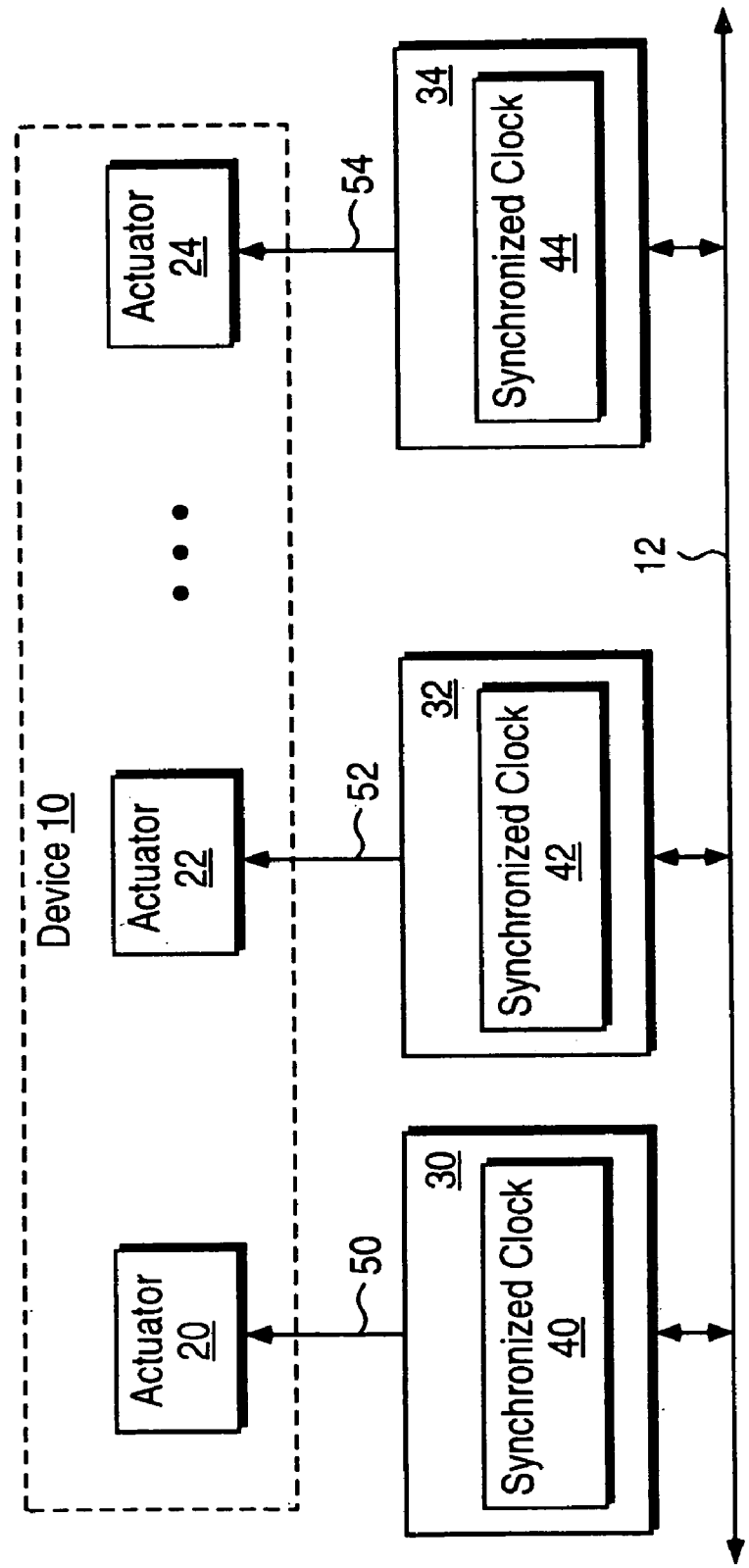
FIG. 1 shows a motion control system for a device according to the present techniques.

FIG. 1 shows a motion control system for a device 10 according to the present techniques. The motion control system includes a set of control nodes 30–34 each of which controls motion along a single axis of the motion control system by driving one of a set of actuators 20–24 of the device 10. Each control node 30–34 includes a corresponding synchronized clock 40–44 which holds a synchronized time value. The control nodes 30–34 coordinate the motions among the axes of the device 10 using the synchronized clocks 40–44.

The control nodes 30–34 participate in a synchronization protocol for synchronizing the time values held in the synchronized clocks 40–44. The synchronization protocol is provided so that the synchronized clocks 40–44 hold time values that agree to an accuracy suitable for coordinating the motions among the axes of the device 10.

The control nodes 30–34 apply sets of control signals 50–54 to the actuators 20–24 to perform a motion control function associated with the device 10. Each control node 30–34 associates a series of control values to be applied to the corresponding actuator 20–24 to a time value according to the motion control function. The applications of the control signals 50–54 to the actuators 20–24 by the control nodes 30–34 are triggered by synchronized time values obtained from the synchronized clocks 40–44. Each control node 30–34 monitors its corresponding synchronized clock 40–44 to determine when to apply a control value to its corresponding actuator 20–24.

The device 10 represents any type of device or any type of mechanical, electrical, chemical, or combination system in which precise coordination of the application of control signals to the actuators 20–24 is desirable. Examples are numerous and include printers, plotters, and manufacturing systems found in a wide variety of industries.

The following discussion focuses on an example embodiment in which the device 10 is a plotter in which the actuator 20 controls the x position of a pen and the actuator 22 controls the y position of the pen and the actuator 24 controls the up/down status of the pen. It is apparent, however, that the teachings provided with respect to the example embodiment are readily applicable to a variety of other devices and systems including very complex systems with many more axes. In fact, one advantage of the present techniques is that very complex systems may be arranged into a distributed control system with relatively simple low-cost control nodes and an accurate synchronized time base that provides coordination among many axes of motion.

The control nodes 30–34 in the example embodiment may implement a motion control function for drawing a circle in which the control nodes 30–32 use the actuators 20–22 to move the x and y positions of the pen along the x and y axes according to the following equations.

$$x = \cos\omega t \quad \text{Eq. 1}$$

$$y = \sin\omega t \quad \text{Eq. 2}$$

The x and y positions yielded by equations 1 and 2 provide the control values to be applied to the actuators 20–22 via the control signals 50–54. The control nodes 30–32 may compute the x and y control values in real-time for a predetermined series of t values using equations 1 and 2 or the x and y control values may be pre-computed for the predetermined series of t values and stored in tables in the control nodes 30–32. The predetermined series of t values provide trigger times for applying the corresponding x and y control values to the actuators 20–22.

Assume for example that at time $t_0$ the control node 30 is to move the pen to position $x_0$ along the x axis and that the control node 32 is to move the pen to position $y_0$ along the y axis in accordance with equations 1 and 2. The control node 30 monitors the synchronized clock 40 and when it reaches to applies the control value $x_0$ to the actuator 20 to move the pen to position $x_0$. Similarly, the control node 32 monitors the synchronized clock 42 and when it reaches to applies the control value $y_0$ to the actuator 22 move the pen to position $y_0$. The precise coordination in movement along the x and y axes is accomplished by the precise synchronization of the synchronized clocks 42–42 in triggering on the to time value.

A motion control system using the control nodes 30–34 each of which provides motion control for a single axis enables the use of simpler and cheaper computing resources in each control node 30–34 in comparison to prior systems in which a single control card handles multiple axes. Each control node 30–34 may be sized and optimized for the characteristics of a particular axis as well as the motion function to be implemented in that axis. Only the exact number of the control nodes 30–34 needed for the particular number of axes of motion is required and extra capacity is not wasted.

In one embodiment, the protocol and related mechanisms for synchronizing the time values held in the synchronized clocks 40–44 are those described in U.S. Pat. No. 5,566,180. For example, each of the synchronized clocks 40–44 may include circuitry for adjusting its respective locally stored time value based upon computations of the sending and receiving time of time data packets which are transferred over a communication link 12. This protocol provides accurate clock synchronization at a relatively low cost with a relatively low bandwidth utilization on the communication link 12.

The communication link 12 may be implemented with one or more of a variety of communication mechanisms. The coordination of motion control provided by the synchronized clocks 40–44 and the synchronization protocol enables the use of a conventional network communication link for the communication link 12 rather than a specialized higher cost link that might otherwise be needed to coordinate motion control among prior control cards that control multiple axes. In one embodiment, the communication link 12 is an Ethernet communication network. In another embodiment, the communication link 12 is a LonTalk field-level control bus which is specialized for the process control environment. In other embodiments, the communication link 12 may be implemented with time division multiple access (TDMA) or token ring protocols to name only a few possibilities.

Figure 2:
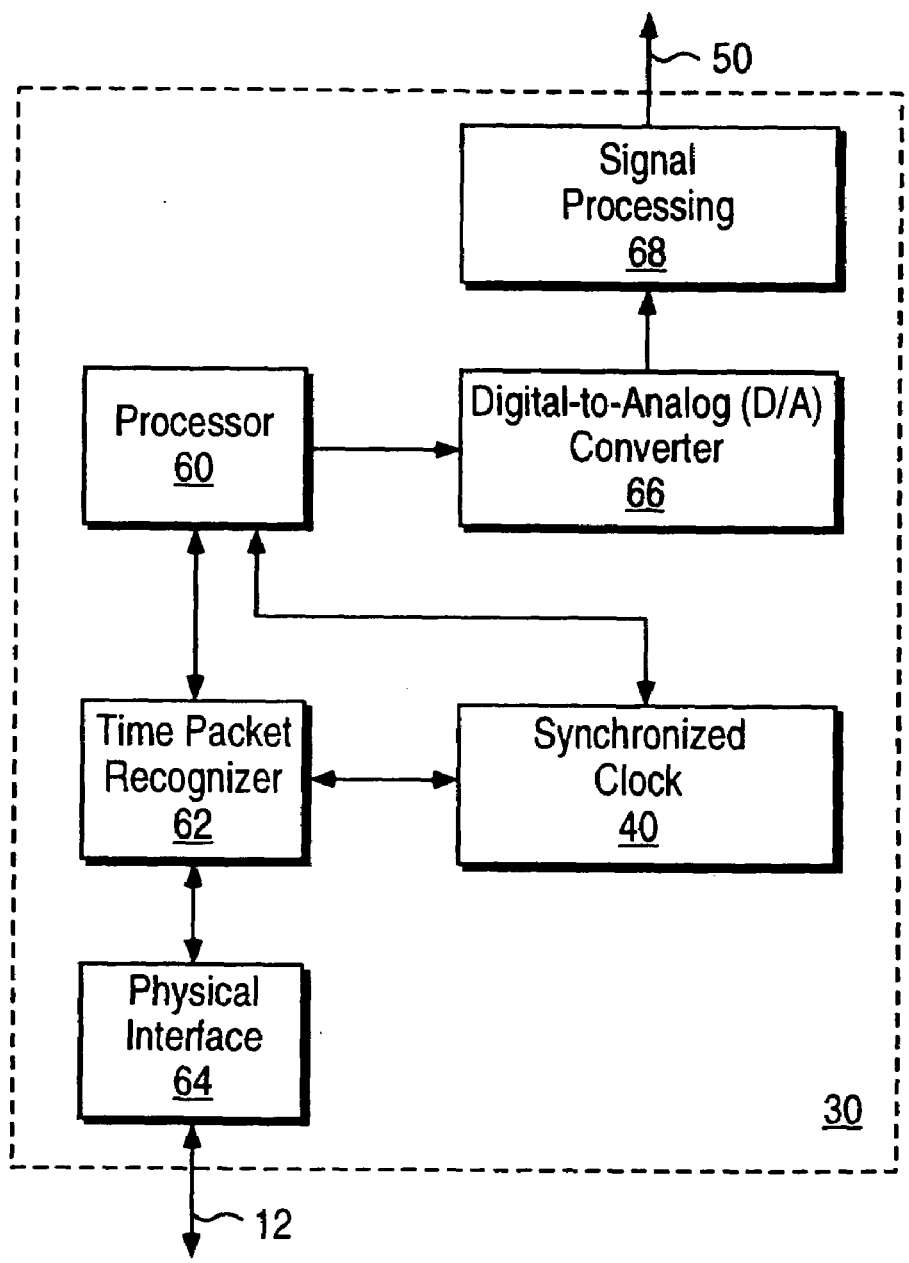
FIG. 2 shows one embodiment of a control node which includes a time packet recognizer.

FIG. 2 shows one embodiment of the control node 30. The control nodes 32–34 may be implemented in a substantially similar manner. The control node 30 includes a processor 60 that implements a motion control function associated with the device 10. The processor 60 associates each control value to be applied to the actuator 20 to a time value. The processor 60 may perform the associations on the fly using motion control calculations or may pre-compute the associations or the associations may be pre-computed and stored in a table for subsequent reading by the processor 60 when applying control values to the actuator 20.

The control node 30 includes a physical interface 64 to the communication link 12 and a time packet recognizer 62 that exchanges timing data packets and follow up packets with the nodes 32–24 according to the protocol for synchronizing the time values held in the synchronized clocks 40–44.

For example, the time packet recognizer 62 generates a first timing data packet and transfers it via the communication link 12 through a physical interface 64. At the time that the time packet recognizer 62 transfers the first timing data packet to the physical interface 64 it samples the synchronized clock 40 to obtain a first time-stamp. The first time-stamp indicates the local time in the control node 30 at which the time packet recognizer 62 transferred the first timing data packet to the physical interface 64. Thereafter, the time packet recognizer 62 generates a follow up packet and transfers it via the communication link 12. The follow up packet includes the first time-stamp. The control nodes 32–34 receive and time stamp the first timing data packet generated by the control node 30. The control nodes 32 then receive the follow up packet and use the differences between the first time stamp contained in the follow up packet and the time stamps associated with the reception of the timing data packet to determine any adjustments needed for the synchronized clocks 42–44.

Similarly, the time packet recognizer 62 receives a second timing data packet generated by one of the control nodes 32–34 through the physical interface 64. The time packet recognizer 62 latches a local time value from the synchronized clock 40 when the second timing data packet is received and this latched time value provides a time stamp for reception of the second timing data packet. Thereafter, the time packet recognizer 62 receives a follow up packet from the control node 32–34 that originated the second timing data packet. The time packet recognizer 62 extracts a second time-stamp from the follow up packet. The difference between the time-stamp from the follow up packet and the time stamp for reception of the timing data packet indicates the relative adjustment needed for the synchronized clock 40 to maintain synchronization among the synchronized clocks 40–44. The difference may be computed by the processor 60.

The synchronized clock 40 is implemented as a counter driven by an oscillator with sufficient stability. The least significant few bits of the counter may be implemented as an adder so that the increment on oscillator periods may be occasionally increased or decreased to effectively speed up or slow down the synchronized clock 40 in accordance with the results of the computation of difference between time stamps for timing data packets and the corresponding time stamps contained in follow up packets.

The processor 60 obtains synchronized time values from the synchronized clock 40 and uses the synchronized time values as triggers for providing a series of control values to a digital-to-analog (DAC) converter 66. For example, a motion control function with respect to the control node 30 may be defined as shown in table 1.

TABLE 1

| $\Delta t$ values | control value |
|---|---|
| 0.010 | 2 |
| 0.020 | 3 |
| 0.025 | 4 |
| 0.030 | 5 |

The $\Delta t$ values are time values relative to a to time value. Each $\Delta t$ value is associated with a control value to be applied to the actuator 20. For example, a control value of 2 is to be applied at time $t_0+0.010$ and a control value of 3 is to be applied at time $t_0+0.020$. The processor 60 monitors the synchronized clock 40 and when it reaches time $t_0+0.010$ writes a control value of 2 to the DAC 66. Similarly, the processor 60 monitors the synchronized clock 40 and writes a control value of 3 to the DAC 66 when the synchronized clock 40 reaches time $t_0+0.020$.

The control nodes 32–34 perform their portion of the motion control function in concert with the control node 30 using control values associated with time values. For example, the control nodes 32–24 may each have a table of control values to be applied at $\Delta t$ intervals relative to a $t_0$. The control nodes 32–34 monitor their respective synchronized clocks 42–44 and apply their respective control values at $\Delta t$ intervals to maintain coordination with the application of control values by the control node 30.

The DAC 66 provides analog control signals to signal processing 68 which in turn drives the control signals 50 to the actuator 20. In other embodiments, the control node 30 may provide digital control values to the actuator 20 via the control signals 50 and the actuator 20 may contain the DAC 66 and signal processing 68.

The processor 60 and its related resources may be scaled according to the particular motion control function being implemented and timing requirements etc. For example, if the processor 60 must calculate control values on the fly using relatively complex motion equations and/or must calculate control values during very brief time intervals then a relatively powerful processor may be needed along with sufficient memory resources. On the other hand, if the equations for motion control are relatively simple or pre-computed or if the time intervals for calculating control values is relatively long, i.e. for relatively slow motion, then simpler and lower cost processor and memory resources may be used thereby lowering the cost of the control node 30.

FIG. 3 shows a motion control system for the device 10 which includes a selector node 14. The control nodes 30–34 include corresponding sets of tables $1\text{-}n_1$, $1\text{-}n_2$, and $1\text{-}n_3$, respectively. Each of the tables $1\text{-}n_1$, $1\text{-}n_2$, and $1\text{-}n_3$ holds a set of control values to be applied to the corresponding actuators 20–24. Each control value in the tables $1\text{-}n_1$, $1\text{-}n_2$, and $1\text{-}n_3$ is associated with a time value which is to be used to trigger the application of the control value as previously described.

The control values in any one or more of the tables $1\text{-}n_1$, $1\text{-}n_2$, and $1\text{-}n_3$ may be pre-computed by the selector node 14 and distributed to the control nodes 30–34 via the communication link 12. Alternatively, the control values in any one or more of the tables $1\text{-}n_1$, $1\text{-}n_2$, and $1\text{-}n_3$ may be pre-computed by the processor resources in the corresponding control node 30–34. The selector node 14 may distribute equations to the control nodes 30–34 via the communication link 12 that enable the control nodes 30–34 to pre-compute the control values for the corresponding tables $1\text{-}n_1$, $1\text{-}n_2$, and $1\text{-}n_3$.

The selector node 14 may determine a motion control function to be applied to the device 10 by transferring messages to the control nodes 30–34 via the communication link 12 that specify which of the tables $1\text{-}n_1$, $1\text{-}n_2$, and $1\text{-}n_3$ is to be used and that specify a starting time to for the motion control function. For example, the selector node 14 may transfer a message to the control node 30 which specifies that table 1 in the control node 30 is to be applied starting at 2 PM and may transfer a message to the control node 32 which specifies that table 3 in the control node 32 is to be applied starting at 2 PM. In response, the control nodes 30–32 monitor their respective synchronized clocks 40–42 and begin applying the specified control values when their respective synchronized clocks 40–42 reach 2 PM.

Alternatively, the selector node 14 may determine a motion control function to be applied to the device 10 by transferring messages to the control nodes 30–34 via the communication link 12 that contain equations for generating a table of control values to be used and that specify a starting time to for the motion control function. For example, the selector node 14 may transfer a message to the control node 30 which specifies that x control values derived from $x=\cos \omega t$ are to be applied starting at 2 PM and may transfer a message to the control node 32 which specifies that y control values derived from y=sin ωt are to be applied starting at 2 PM. In response, the control nodes 30–32 pre-compute the control values using these equations and then monitor their respective synchronized clocks 40–42 and begin applying the pre-computed control values when their respective synchronized clocks 40–42 reach 2 PM.

In another alternative, the selector node 14 may determine a motion control function to be applied to the device 10 by transferring messages to the control nodes 30–34 via the communication link 12 that contain pre-computed control values and associated time values and that specify a starting time to for the motion control function.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A motion control system comprising a set of control nodes each for controlling motion along a single axis of the motion control system, each control node having a clock and each obtaining a set of information via a network that pertains to a control value to be applied to the corresponding axis and in response each control node applying the corresponding control value to the corresponding axis when a trigger time associated with the corresponding control value matches a time in the corresponding clock such that application of the control values to the axes is coordinated by the trigger times and synchronizing the times in the clocks.

2. The motion control system of claim 1, wherein each set of information specifies the trigger time and the control value for the corresponding axis.

3. The motion control system of claim 1, wherein each set of information specifies a set of equations for determining the trigger time and control value for the corresponding axis.

4. The motion control system of claim 3, wherein each control node includes a set of processing resources for determining the trigger time and the control value in response to the corresponding set of equations.

5. The motion control system of claim 4, wherein the processing resources of each control node are scaled in response to the corresponding equations.

6. A motion control system comprising:
a set of control nodes each for controlling motion along a single axis of the motion control system, each control node having a clock and a set of tables each for holding a set of pre-computed control values and corresponding trigger times for a corresponding set of motion control functions of the corresponding axis;
selector node that transfers a set of information to each control node via the network that specifies one of the motion control functions to be performed in the corresponding axis such that each control node in response to the corresponding information obtains a control value for the specified motion control function from the corresponding tables and applies the control value to the corresponding axis when the corresponding trigger time matches a time in the corresponding clock such that the motion control functions of the axes are coordinated by the trigger times in the tables and synchronizing the times in the clocks.

7. The motion control system of claim 6, wherein the pre-computed control values and trigger times are generated by the selector node and transferred to the control nodes via the network.

8. The motion control system of claim 6, wherein the pre-computed control values and trigger times are generated by a set of processing resources in each control node.

9. The motion control system of claim 6, wherein each set of information identifies a subset of the corresponding tables and a starting time such that each control node obtains the control value and the trigger time from the identified tables and applies the control value in accordance with the corresponding specified starting time.

10. A method for controlling a set of axes of a motion control system, comprising the steps of:
for each axis, obtaining a set of information via a network that pertains to a control value to be applied to the axis;
for each axis, applying the control value to the axis when a trigger time associated with the control value matches a time in a clock associated with the axis such that application of the control values to the axes is coordinated by the trigger times and synchronizing the times in the clocks.

11. The method of claim 10, wherein one or more of the sets of information specifies the trigger time and the control value for the corresponding axis.

12. The method of claim 10, wherein one or more of the sets of information specifies a set of equations for determining the trigger time and control value for the corresponding axis.

13. The method of claim 12, further comprising the step of determining the trigger time and the control value in response to the corresponding set of equations.

14. The method of claim 13, further comprising the step of scaling a set of processing resource for the corresponding axis in response to the corresponding equations.

15. The method of claim 10, further comprising the step of generating a set of pre-computed control values and trigger times for each axis.

16. The method of claim 15, wherein each set of information specifies a subset of the pre-computed control values and trigger times and a starting time.

17. The method of claim 16, further comprising the steps of for each axis obtaining the control value and the trigger time from the specified subset and applying the control value in accordance with the corresponding specified starting time.

18. A motion control system, comprising:
first control node for controlling a motion of a first axis of the motion control system, the first control node having a first synchronized clock and means for triggering the motion of the first axis when a trigger time associated with the first axis matches a time in the first synchronized clock;
second control node for controlling a motion of a second axis of the motion control system, the second control node having a second synchronized clock and means for triggering the motion of the second axis when a trigger time associated with the second axis matches a time in the second synchronized clock;
such that the motions of the first and second axes are started at substantially the same time by setting each trigger time equal to a starting time.

19. The motion control system of claim 18, wherein the starting time is sent to the first and second control nodes via a network.

20. The motion control system of claim 19, wherein a set of control values associated with each motion is sent to the first and second control nodes via the network.

* * * * *